United States Patent
Yoshiwara et al.

(10) Patent No.: US 10,870,766 B2
(45) Date of Patent: Dec. 22, 2020

(54) CARBON NANOTUBE DISPERSION LIQUID, CONDUCTOR FILM, AND CONDUCTIVE FILM

(71) Applicant: ZEON CORPORATION, Tokyo (JP)

(72) Inventors: Akihiko Yoshiwara, Tokyo (JP); Kiyoshige Kojima, Tokyo (JP); Yasuo Mukunoki, Yokohama (JP); Akihiro Kojima, Yokohama (JP); Masashi Ikegami, Yokohama (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/114,466

(22) PCT Filed: Jan. 29, 2015

(86) PCT No.: PCT/JP2015/000401
§ 371 (c)(1),
(2) Date: Jul. 27, 2016

(87) PCT Pub. No.: WO2015/115102
PCT Pub. Date: Aug. 6, 2015

(65) Prior Publication Data
US 2016/0340521 A1   Nov. 24, 2016

(30) Foreign Application Priority Data
Jan. 31, 2014   (JP) ................. 2014-017778

(51) Int. Cl.
| C09D 5/24 | (2006.01) |
| H01B 1/04 | (2006.01) |
| C09D 7/40 | (2018.01) |
| C09D 1/00 | (2006.01) |
| C08L 25/18 | (2006.01) |
| C01B 32/174 | (2017.01) |
| C01B 32/05 | (2017.01) |
| C09D 7/45 | (2018.01) |
| C09D 133/02 | (2006.01) |
| C09D 133/08 | (2006.01) |
| C09D 133/10 | (2006.01) |
| C09D 135/02 | (2006.01) |
| C09D 141/00 | (2006.01) |
| H01B 1/24 | (2006.01) |
| C08K 3/04 | (2006.01) |

(52) U.S. Cl.
CPC ............... *C09D 5/24* (2013.01); *C01B 32/05* (2017.08); *C01B 32/174* (2017.08); *C08L 25/18* (2013.01); *C09D 1/00* (2013.01); *C09D 7/40* (2018.01); *C09D 7/45* (2018.01); *C09D 133/02* (2013.01); *C09D 133/08* (2013.01); *C09D 133/10* (2013.01); *C09D 135/02* (2013.01); *C09D 141/00* (2013.01); *H01B 1/04* (2013.01); *H01B 1/24* (2013.01); *C08K 3/041* (2017.05)

(58) Field of Classification Search
CPC .................................. H01B 1/04; C09D 5/24
See application file for complete search history.

(56) References Cited

U.S. PATENT DOCUMENTS

| 5,403,744 A * | 4/1995 | Zimmerle ............. G01N 31/22 |
| | | 422/401 |
| 2006/0188723 A1* | 8/2006 | Rowley ................. B82Y 10/00 |
| | | 428/408 |
| 2008/0318049 A1 | 12/2008 | Hata et al. |
| 2014/0060602 A1* | 3/2014 | Aoai ..................... B82Y 30/00 |
| | | 136/205 |

FOREIGN PATENT DOCUMENTS

| JP | 2009163959 A | 7/2009 |
| JP | 2013018673 A | 1/2013 |
| JP | 2013199419 A | 10/2013 |
| TW | 201335125 A | 9/2013 |
| WO | 2006011655 A1 | 2/2006 |
| WO | 2013042482 A1 | 3/2013 |
| WO | 2013073259 A1 | 5/2013 |

OTHER PUBLICATIONS

Chemical Book, product data sheet for polystyrene sulfonic acid, undated (Year: 2020).*
Sep. 14, 2017, Extended European Search Report issued by the European Patent Office in the corresponding European Patent Application No. 15743847.4.
Shuhui Qin et al., "Solubilization and Purification of Single-Wall Carbon Nanotubes in Water by in Situ Radical Polymerization of Sodium 4-Styrenesulfonate", Macromolecules, Apr. 28, 2004, pp. 3965-3967, vol. 37, No. 11, American Chemical Society.
Apr. 21, 2015, International Search Report issued in the International Patent Application No. PCT/JP2015/000401.
Aug. 2, 2016, International Preliminary Report on Patentability issued in the International Patent Application No. PCT/JP2015/000401.

* cited by examiner

Primary Examiner — William D Young
(74) Attorney, Agent, or Firm — Kenja IP Law PC

(57) ABSTRACT

Provided is a carbon nanotube dispersion liquid that has excellent stability and that can be used to form a conductor film that exhibits excellent adhesiveness to a substrate. The carbon nanotube dispersion liquid contains carbon nanotubes (A), a polymeric dispersant (B) including a sulfonic acid group-containing monomeric unit and an ethylenically unsaturated aliphatic carboxylic acid monomeric unit, and a solvent (C). Percentage content of the ethylenically unsaturated aliphatic carboxylic acid monomeric unit in the polymeric dispersant (B) is greater than 20 mol % and no greater than 90 mol %.

7 Claims, No Drawings

CARBON NANOTUBE DISPERSION LIQUID, CONDUCTOR FILM, AND CONDUCTIVE FILM

TECHNICAL FIELD

The present disclosure relates to a carbon nanotube dispersion liquid, a conductor film, and a conductive film.

BACKGROUND

Carbon nanotubes (hereinafter also referred to as "CNTs") have been conventionally considered for various industrial applications due to having various excellent properties such as conductivity, thermal conductivity, and mechanical strength. For example, a technique that takes advantage of the excellent conductivity of CNTs in order to form a conductor film using CNTs has been considered.

A conductor film including CNTs can for example be formed on a substrate by applying thereon a carbon nanotube dispersion liquid (hereinafter also referred to as a "CNT dispersion liquid") including CNTs, a solvent, and a dispersant for uniformly dispersing the CNTs in the solvent, and drying the CNT dispersion liquid on the substrate. There have been efforts made to improve the dispersant and the CNT dispersion liquid used to form such a conductor film in order to improve the performance of the conductor film and also of a conductive film including the substrate and the conductor film thereon.

For example, PTL 1 reports a transparent conductive film that includes a conductor film formed by CNTs and an aromatic polymer used as a dispersant, and a resin layer above the conductor film, and that has a specific light transmittivity and surface resistivity. The transparent conductive film is reported to have high durability, high conductivity, and excellent light transmittivity.

In another example, PTL 2 reports an aqueous CNT dispersion liquid that includes a dispersant having a number-average molecular weight of at least 10,000 and no greater than 150,000, such as a polysaccharide, in a specific ratio relative to CNTs and that has a pH adjusted to within a specific range. The CNT dispersion liquid is reported to maintain high dispersibility while displaying excellent stability against high shearing force.

In a further example, PTL 3 reports a polystyrene sulfonate copolymer that displays high dispersing ability with respect to CNTs or the like in an aqueous medium. The polystyrene sulfonate polymer includes a styrene sulfonic acid monomer residue, a maleimide residue having a substituted or unsubstituted aromatic hydrocarbon group on the nitrogen atom, and another vinyl monomer residue derived from itaconic acid, fumaric acid, or the like, as repeating structural units that are each represented by a specific structural formula. The percentage contents of these residues are 30 mol % to 95 mol %, 5 mol % to 70 mol %, and 0 mol % to 20 mol %, respectively.

CITATION LIST

Patent Literature

PTL 1: JP 2009-163959 A
PTL 2: JP 2013-199419 A
PTL 3: WO 2013/042482 A1

SUMMARY

Technical Problem

A CNT dispersion liquid used to form a conductor film is expected to have excellent stability that can inhibit aggregation of CNTs and the like in order to ensure conductivity, mechanical properties, transparency, and so forth of an obtained conductor film. Furthermore, the conductor film formed from the CNT dispersion liquid is expected to exhibit excellent adhesiveness to a substrate.

However, CNT dispersion liquid stability and adhesiveness to a substrate of a conductor film formed from a CNT dispersion liquid have been inadequate in conventional techniques. Therefore, these conventional techniques still leave room for improvement in terms of CNT dispersion liquid stability and adhesiveness to a substrate of a conductor film formed from a CNT dispersion liquid.

An objective of the present disclosure is to provide a carbon nanotube dispersion liquid that has excellent stability and that can be used to form a conductor film that exhibits excellent adhesiveness to a substrate.

Another objective of the present disclosure is to provide a conductor film that exhibits excellent adhesiveness to a substrate and a conductive film including the conductor film.

Solution to Problem

The inventors conducted diligent investigation in order to achieve the objectives described above. The inventors discovered that when a polymeric dispersant composed of a polymer including a sulfonic acid group-containing monomeric unit and including a specific percentage content of an ethylenically unsaturated aliphatic carboxylic acid monomeric unit is used as a dispersant for dispersing CNTs in a solvent, aggregation of CNTs in the resultant CNT dispersion liquid can be inhibited and a conductor film formed using the CNT dispersion liquid can be provided with excellent adhesiveness to a substrate. This discovery led to the present disclosure.

Specifically, in order to achieve the objective of the present disclosure of advantageously solving the problems described above, a presently disclosed carbon nanotube dispersion liquid contains carbon nanotubes (A), a polymeric dispersant (B) including a sulfonic acid group-containing monomeric unit and an ethylenically unsaturated aliphatic carboxylic acid monomeric unit, and a solvent (C), wherein percentage content of the ethylenically unsaturated aliphatic carboxylic acid monomeric unit in the polymeric dispersant (B) is greater than 20 mol % and no greater than 90 mol %. When a polymeric dispersant including a sulfonic acid group-containing monomeric unit and including a specific percentage content of an ethylenically unsaturated aliphatic carboxylic acid monomeric unit is used as a dispersant for dispersing CNTs as described above, a carbon nanotube dispersion liquid can be provided that has excellent stability and that can be used to form a conductor film that exhibits excellent adhesiveness to a substrate.

As used in this disclosure, the phrase "includes a monomeric unit" means that "a polymer obtained with the corresponding monomer includes a structural unit derived from the monomer".

In the presently disclosed carbon nanotube dispersion liquid, the sulfonic acid group-containing monomeric unit included in the polymeric dispersant (B) is preferably a monomeric unit derived from an aromatic sulfonic acid or a salt of an aromatic sulfonic acid. Stability of the CNT dispersion liquid can be further enhanced as a result of the polymeric dispersant (B) including a monomeric unit derived from an aromatic sulfonic acid or a salt of an aromatic sulfonic acid as the sulfonic acid group-containing monomeric unit.

In the presently disclosed carbon nanotube dispersion liquid, the ethylenically unsaturated aliphatic carboxylic acid monomeric unit included in the polymeric dispersant (B) is preferably a monomeric unit derived from at least one selected from the group consisting of acrylic acid, methacrylic acid, maleic acid, fumaric acid, itaconic acid, and salts thereof. Stability of the CNT dispersion liquid can be further enhanced as a result of the polymeric dispersant (B) including a monomeric unit derived from any of the aforementioned monomers as the ethylenically unsaturated aliphatic carboxylic acid monomeric unit.

In the presently disclosed carbon nanotube dispersion liquid, percentage content of the sulfonic acid group-containing monomeric unit in the polymeric dispersant (B) is preferably at least 10 mol % and less than 80 mol %. Stability of the CNT dispersion liquid and adhesiveness to a substrate of a conductor film formed from the dispersion liquid can be further enhanced as a result of the polymeric dispersant (B) including the sulfonic acid group-containing monomeric unit with the percentage content described above.

In the presently disclosed carbon nanotube dispersion liquid, a ratio of the percentage content of the sulfonic acid group-containing monomeric unit in the polymeric dispersant (B) relative to the percentage content of the ethylenically unsaturated aliphatic carboxylic acid monomeric unit in the polymeric dispersant (B) is preferably at least 0.5 and less than 4. Stability of the CNT dispersion liquid and adhesiveness to a substrate of a conductor film formed from the dispersion liquid can be further enhanced as a result of the ratio of the percentage content of the sulfonic acid group-containing monomeric unit in the polymeric dispersant (B) relative to the percentage content of the ethylenically unsaturated aliphatic carboxylic acid monomeric unit in the polymeric dispersant (B) being in the range described above.

In the presently disclosed carbon nanotube dispersion liquid, the carbon nanotubes (A) preferably include either or both of single-walled carbon nanotubes and double-walled carbon nanotubes. A conductor film formed from the CNT dispersion liquid can be provided with excellent conductivity and mechanical properties as a result of either or both of single-walled carbon nanotubes (hereinafter also referred to as "single-walled CNTs") and double-walled carbon nanotubes (hereinafter also referred to as "double-walled CNTs") being used as the CNTs.

Additionally, in the presently disclosed carbon nanotube dispersion liquid, the solvent (C) preferably includes water and pH of the carbon nanotube dispersion liquid is preferably at least 0.1 and no greater than 8. Stability of the CNT dispersion liquid can be further enhanced as a result of water being used as a solvent and the pH being at least 0.1 and no greater than 8.

In the presently disclosed carbon nanotube dispersion liquid, an amount of the polymeric dispersant (B) per 100 parts by mass of the carbon nanotubes (A) is preferably at least 50 parts by mass and no greater than 1,000 parts by mass. Stability of the CNT dispersion liquid and adhesiveness to a substrate of a conductor film formed from the CNT dispersion liquid can be further enhanced as a result of the amount of the dispersant (B) relative to the CNTs being in the range described above.

Furthermore, in order to achieve the objective of the present disclosure of advantageously solving the problems described above, a presently disclosed conductor film is obtainable using any one of the carbon nanotube dispersion liquids described above. A conductor film that exhibits excellent adhesiveness to a substrate can be provided through use of the presently disclosed CNT dispersion liquid.

The presently disclosed conductor film preferably has a surface resistivity of no greater than 20 Ω/sq. As a result of the surface resistivity of the conductor film being in the range described above, a conductive film including the conductor film on a substrate can for example be provided with excellent conductivity.

Furthermore, in order to achieve the objective of the present disclosure of advantageously solving the problems described above, a presently disclosed conductive film includes a substrate and a conductor film on the substrate, wherein the conductor film is any one of the conductor films described above. The conductive film including the presently disclosed conductor film has excellent conductivity.

Advantageous Effect

According to the present disclosure, a carbon nanotube dispersion liquid can be provided that has excellent stability and that can be used to form a conductor film that exhibits excellent adhesiveness to a substrate.

Furthermore, according to the present disclosure, a conductor film that exhibits excellent adhesiveness to a substrate and a conductive film including the conductor film can be provided.

DETAILED DESCRIPTION

The following provides a detailed description of embodiments of the present disclosure.

Herein, a presently disclosed carbon nanotube dispersion liquid is used to form a conductor film. Moreover, a presently disclosed conductor film is formed from the presently disclosed carbon nanotube dispersion liquid. Furthermore, a presently disclosed conductive film includes the presently disclosed conductor film on a substrate.

(Carbon Nanotube Dispersion Liquid)

The presently disclosed carbon nanotube dispersion liquid contains carbon nanotubes (A), a polymeric dispersant (B), a solvent (C). A feature of the presently disclosed carbon nanotube dispersion liquid is that the polymeric dispersant (B) includes a sulfonic acid group-containing monomeric unit and includes a specific percentage content of an ethylenically unsaturated aliphatic carboxylic acid monomeric unit. The presently disclosed carbon nanotube dispersion liquid has excellent stability and a conductor film formed therefrom exhibits excellent adhesiveness to a substrate. The following describes each component contained in the CNT dispersion liquid in detail.

Note that in the present description, the "carbon nanotubes (A)" may be referred to as "CNTs (A)" and the "polymeric dispersant (B) including a sulfonic acid group-containing monomeric unit and an ethylenically unsaturated aliphatic carboxylic acid monomeric unit" may be referred to as "polymeric dispersant (B)".

<Carbon Nanotubes (A)>

The CNTs (A) may be single-walled carbon nanotubes or multi-walled carbon nanotubes. However, from a viewpoint of improving conductivity and mechanical properties of a conductor film formed from the CNT dispersion liquid, it is preferable that the CNTs (A) include either or both of single-walled carbon nanotubes and double-walled carbon nanotubes, and more preferable that the CNTs (A) include single-walled carbon nanotubes.

The CNTs (A) preferably exhibit a radial breathing mode (RBM) peak when evaluated by Raman spectroscopy. Note that an RBM does not appear in the Raman spectrum of multi-walled carbon nanotubes having three or more walls.

Furthermore, a ratio of G band peak intensity relative to D band peak intensity (G/D ratio) in a Raman spectrum of the CNTs (A) is preferably at least 1 and no greater than 20. A G/D ratio of at least 1 and no greater than 20 enables sufficient improvement in conductivity and mechanical properties of a conductor film formed from the CNT dispersion liquid even if the blended amount of the CNTs (A) is only small.

A ratio (3σ/Av) of a diameter distribution (3σ) of the CNTs (A) relative to an average diameter (Av) of the CNTs (A) is preferably greater than 0.20 and less than 0.60, more preferably greater than 0.25, and particularly preferably greater than 0.50. Through use of CNTs for which 3σ/Av is greater than 0.20 and less than 0.60, conductivity and mechanical properties of a conductor film formed from the CNT dispersion liquid can be sufficiently improved even if the blended amount of the CNTs (A) is small.

Note that the "diameter distribution (3σ)" refers to a value obtained by multiplying the sample standard deviation (σ) of carbon nanotube diameters by 3. The "average diameter (Av) of the carbon nanotubes" and the "sample standard deviation (σ) of carbon nanotube diameters" can each be obtained by measuring the diameters of 100 randomly selected carbon nanotubes using a transmission electron microscope.

Herein, the average diameter (Av) of the CNTs (A) is preferably at least 0.5 nm and more preferably at least 1 nm, and is preferably no greater than 15 nm and more preferably no greater than 10 nm. Aggregation of the CNTs (A) can be inhibited and stability of the CNT dispersion liquid can be further enhanced as a result of the average diameter (Av) of the CNTs (A) being at least 0.5 nm. Furthermore, mechanical properties of a conductor film formed from the CNT dispersion liquid can be sufficiently improved as a result of the average diameter (Av) of the CNTs (A) being no greater than 15 nm.

The average diameter (Av) and the diameter distribution (3σ) of the CNTs (A) described above may be adjusted by altering the production method or production conditions of the CNTs, or may be adjusted by combining a plurality of types of CNTs obtained by different production methods.

CNTs used as the CNTs (A) normally take a normal distribution when a plot of diameter on a horizontal axis and probability density on a vertical axis is made using diameters of 100 random selected CNTs measured using a transmission electron microscope, and a Gaussian approximation is made.

The CNTs (A) preferably have a specific surface area prior to addition to the solvent (C) of at least 600 m²/g. The CNTs (A) may be open CNTs or closed CNTs. In the case of closed CNTs, the specific surface area is preferably at least 800 m²/g, and is preferably no greater than 1,200 m²/g and more preferably no greater than 1,000 m²/g. On the other hand, in the case of open CNTs, the specific surface area is preferably at least 1,300 m²/g, and is preferably no greater than 2,500 m²/g and more preferably no greater than 2,300 m²/g. Conductivity and mechanical properties of a conductor film formed using the CNT dispersion liquid can be favorably improved as a result of the specific surface area of the CNTs (A) being at least 600 m²/g. Moreover, stability of the CNT dispersion liquid can be improved as a result of the specific surface area of the CNTs (A) being in the range described above.

Specific surface area referred to in the present disclosure is BET specific surface area according to nitrogen gas adsorption.

The CNTs (A) preferably have a weight density of at least 0.002 g/cm³ and no greater than 0.2 g/cm³. A weight density of no greater than 0.2 g/cm³ can enable more uniform dispersion of the CNTs (A) because attachment between the CNTs (A) is weak. A weight density of at least 0.002 g/cm³ improves unity of the CNTs (A), which facilitates handling of the CNTs (A) by preventing the CNTs (A) from becoming unbound.

The CNTs (A) preferably have micropores. These micropores are preferably pores having a pore diameter of less than 2 nm. The amount of micropores present in the CNTs (A), expressed as a micropore volume, is preferably at least 0.40 mL/g, more preferably at least 0.43 mL/g, and particularly preferably at least 0.45 mL/g, and normally has an upper limit of approximately 0.65 mL/g. As a result of the CNTs (A) having micropores such as described above, aggregation of the CNTs (A) can be inhibited, dispersibility of the CNTs (A) in a CNT-containing film can be improved, and a conductor film having excellent conductivity and mechanical properties can be efficiently obtained. The micropore volume can for example be adjusted by altering the production method and production conditions of the CNTs (A).

Herein, "micropore volume (Vp)" can be calculated from equation (I)—$Vp=(V/22,414) \times (M/\rho)$—by measuring a nitrogen adsorption isotherm of the CNTs at liquid nitrogen temperature (77 K) and by setting an amount of adsorbed nitrogen at a relative pressure $P/P0=0.19$ as V. It should be noted that P is a measured pressure at adsorption equilibrium, P0 is a saturated vapor pressure of liquid nitrogen at time of measurement, and, in equation (I), M is a molecular weight of 28.010 of the adsorbate (nitrogen) and $\rho$ is a density of 0.808 g/cm³ of the adsorbate (nitrogen) at 77 K. The micropore volume can for example be easily obtained using a BELSORP®-mini (BELSORP is a registered trademark in Japan, other countries, or both) produced by Bel Japan Inc.

The CNTS (A) having the properties described above can for example be efficiently produced through a method (super growth method; refer to WO 2006/011655 A1) in which, during synthesis of carbon nanotubes through chemical vapor deposition (CVD) by supplying a feedstock compound and a carrier gas onto a substrate (hereinafter also referred to as a "substrate for CNT production") having a catalyst layer for CNT production on the surface thereof, catalytic activity of the catalyst layer for CNT production is dramatically improved by providing a trace amount of an oxidizing agent (catalyst activating material) in the system, wherein the catalyst layer is formed on the surface of the substrate through a wet process and a feedstock gas having acetylene as a main component (for example, a gas including at least 50 vol % of acetylene) is used. Carbon nanotubes obtained by the super growth method may also be referred to hereinafter as "SGCNTs". Adhesiveness of a conductor film to a substrate can be further enhanced as a result of SGCNTs being used as the CNTs (A).

Although no specific limitations are placed on the concentration of the CNTs (A) in the presently disclosed CNT dispersion liquid so long as the dispersion liquid can be formed, the concentration of the CNTs (A) is preferably at least 0.005 mass %, more preferably at least 0.01 mass %, further preferably at least 0.05 mass %, and particularly preferably at least 0.1 mass %, and is preferably no greater than 20 mass %, more preferably no greater than 10 mass %, and particularly preferably no greater than 5 mass %.

The presently disclosed CNT dispersion liquid is advantageous in terms that the polymeric dispersant (B) used as a dispersant, which is explained further below, makes a significant contribution to ensuring stability of the CNT dispersion liquid even when the concentration of CNTs is high compared to conventional CNT dispersion liquids. When a high concentration of CNTs is included in the CNT dispersion liquid, the applied amount of CNTs per unit area of a substrate can be increased to a target level through fewer applications than when using conventional CNT dispersion liquids.

<Polymeric Dispersant (B)>

A polymeric dispersant including a sulfonic acid group-containing monomeric unit and including a specific percentage content of an ethylenically unsaturated aliphatic carboxylic acid monomeric unit is used as a dispersant in the presently disclosed CNT dispersion liquid.

Aggregation of the CNTs (A) in the CNT dispersion liquid can be inhibited and the CNT dispersion liquid can be provided with excellent stability as a result of a polymeric dispersant such as described above being used. A conductor film formed from the CNT dispersion liquid containing the polymeric dispersant (B) exhibits excellent adhesiveness to a substrate due to the contribution of both sulfonic acid groups and carboxy groups included in the polymeric dispersant.

Normally a dispersant forms a resistance in a conductor film after formation thereof and may reduce conductivity of the conductor film. However, due to the excellent dispersing effect on the CNTs (A) of the polymeric dispersant (B) used herein, the presently disclosed CNT dispersion liquid can be used to obtain a conductor film having excellent conductivity that is not affected by the dispersant acting as a cause of resistance.

The following provides a detailed description of monomers that can be used to form monomeric units composing the polymeric dispersant (B).

[Sulfonic Acid Group-Containing Monomer]

No specific limitations are placed on sulfonic acid group-containing monomers that can be used to form the sulfonic acid group-containing monomeric unit of the polymeric dispersant (B) other than being a monomer that includes a sulfonic acid group and a group such as an unsaturated carbon-carbon bond or the like that enables copolymerization with another monomer. Examples of sulfonic acid group-containing monomers that can be used include aromatic sulfonic acids such as styrene sulfonic acid, vinyl sulfonic acid, allyl sulfonic acid, acrylamide-t-butyl-sulfonic acid, and acrylamide-N-butanesulfonic acid. Note that the sulfonic acid group-containing monomer may be in the form of an inorganic salt or an organic salt in which the hydrogen atom in the sulfonic acid group is substituted by an inorganic ion or an organic ion. In other words, the sulfonic acid group-containing monomer may be in the form of a sulfonate salt.

Examples of inorganic salts that can be used include alkali metal salts (for example, lithium, sodium, and potassium). Examples of organic salts that can be used include alkylamine salts (for example, methylamine, ethylamine, propylamine, butylamine, dimethylamine, diethylamine, trimethylamine, tripropylamine, tributylamine, and tri-t-butylamine) and arylamine salts (for example, phenylamine and benzylamine). Any one of such sulfonic acid group-containing monomers may be used or any two or more of such sulfonic acid group-containing monomers may be used in combination.

Among the above examples, aromatic sulfonic acids such as styrene sulfonic acid, vinyl sulfonic acid, acrylamide-t-butyl-sulfonic acid, and alkali metal salts (sodium and potassium) thereof are preferable, and styrene sulfonic acid, vinyl sulfonic acid, and alkali metal salts (sodium and potassium) thereof are more preferable as the sulfonic acid group-containing monomer from a viewpoint of improving stability of the CNT dispersion liquid.

The percentage content of the sulfonic acid group-containing monomeric unit in the polymeric dispersant (B) (percentage of sulfonic acid group-containing monomeric units among all monomeric units) is normally at least 10 mol % and less than 80 mol %, is preferably at least 20 mol %, more preferably at least 30 mol %, and particularly preferably at least 40 mol %, and is preferably no greater than 70 mol % and more preferably no greater than 60 mol %. As a result of the percentage content of the sulfonic acid group-containing monomeric unit in the polymeric dispersant (B) being in the range described above, the CNT dispersion liquid can be provided with excellent stability and a conductor film formed from the dispersion liquid can be provided with excellent adhesiveness to a substrate.

[Ethylenically Unsaturated Aliphatic Carboxylic Acid Monomer]

No specific limitations are placed on ethylenically unsaturated aliphatic carboxylic acid monomers that can be used to form the ethylenically unsaturated aliphatic carboxylic acid monomeric unit in the polymeric dispersant (B) other than being an aliphatic carboxylic acid having a carbon-carbon double bond that is copolymerizable with another monomer. Examples of ethylenically unsaturated aliphatic carboxylic acid monomers that can be used include acrylic acid, methacrylic acid, maleic acid, fumaric acid, and itaconic acid. Note that the ethylenically unsaturated aliphatic carboxylic acid monomer may be in the form of an inorganic salt or an organic salt in which the hydrogen atom in the carboxy group is substituted by an inorganic ion or an organic ion. In other words, the ethylenically unsaturated aliphatic carboxylic acid may be in the form of a carboxylate salt. Herein, examples of inorganic salts and organic salts that can be used are the same as those described above in the section titled "Sulfonic acid group-containing monomer". Any one of these ethylenically unsaturated aliphatic carboxylic acid monomers may be used or two or more of these ethylenically unsaturated aliphatic carboxylic acid monomers may be used in combination.

Note that adhesiveness to a substrate can be substantially improved through the polymeric dispersant (B) having a repeating structure derived from an ethylenically unsaturated aliphatic carboxylic acid monomer compared to if a structure derived from an ethylenically unsaturated aromatic carboxylic acid monomer (for example, N-carboxyphenylmaleimide or 4-vinylbenzoic acid) is included.

From a viewpoint of improving stability of the CNT dispersion liquid, acrylic acid, methacrylic acid, maleic acid, fumaric acid, itaconic acid, and salts thereof are preferable, and acrylic acid, methacrylic acid, maleic acid, fumaric acid, itaconic acid, and alkali metal salts (sodium and potassium) thereof are more preferable as the ethylenically unsaturated aliphatic carboxylic acid monomer.

The percentage content of the ethylenically unsaturated aliphatic carboxylic acid monomeric unit in the polymeric dispersant (B) (percentage of ethylenically unsaturated aliphatic carboxylic acid monomeric units among all monomeric units) is required to be greater than 20 mol % and no greater than 90 mol %, is preferably at least 25 mol %, more preferably at least 30 mol %, and particularly preferably at least 40 mol %, and is preferably no greater than 80 mol %, more preferably no greater than 70 mol %, and particularly preferably no greater than 60 mol %. If the percentage content of the ethylenically unsaturated aliphatic carboxylic acid monomeric unit in the polymeric dispersant (B) is 20 mol % or less, it is not possible to ensure adhesiveness to a substrate, whereas if the percentage content is greater than 90 mol %, it is not possible to ensure a balance of both solubility in the solvent and dispersibility of the CNTs.

[Sulfonic Acid Group-Containing Monomer/Ethylenically Unsaturated Aliphatic Carboxylic Acid Monomer Molar Ratio]

A ratio of the percentage content (mol %) of the sulfonic acid group-containing monomeric unit relative to the percentage content (mol %) of the ethylenically unsaturated aliphatic carboxylic acid monomeric unit in the polymeric dispersant (B) (hereinafter also referred to as the "sulfonic acid group-containing monomer/ethylenically unsaturated aliphatic carboxylic acid monomer molar ratio") is preferably at least 0.5 and more preferably at least 1, and is preferably less than 4 and more preferably no greater than 3. As a result of the sulfonic acid group-containing monomer/ethylenically unsaturated aliphatic carboxylic acid monomer molar ratio being in the range described above, the CNT dispersion liquid can be provided with excellent stability and a conductor film formed from the CNT dispersion liquid can be provided with excellent adhesiveness to a substrate.

[Other Monomers]

The polymeric dispersant (B) may include other freely selected repeating units besides the sulfonic acid group-containing monomeric unit and the ethylenically unsaturated aliphatic carboxylic acid monomeric unit described above so long as such inclusion does not lead to a significant loss of the effects disclosed herein. Examples of other monomers that can be used to form a freely selected repeating unit such as described above include esters of acrylic acid (for example, methyl acrylate, ethyl acrylate, propyl acrylate, butyl acrylate, and benzyl acrylate), esters of methacrylic acid (for example, methyl methacrylate, ethyl methacrylate, propyl methacrylate, butyl methacrylate, and benzyl methacrylate), esters of itaconic acid (for example, methyl itaconate, ethyl itaconate, propyl itaconate, butyl itaconate, and benzyl itaconate), styrene, acrylonitrile, methacrylonitrile, acrylamide, methacrylamide, itaconic amide, and N,N-dimethylacrylamide.

The percentage content of monomeric units other than the sulfonic acid group-containing monomeric unit and the ethylenically unsaturated aliphatic carboxylic acid monomeric unit in the polymeric dispersant (B) is preferably no greater than 30 mol %, more preferably no greater than 20 mol %, further preferably no greater than 10 mol %, and particularly preferably no greater than 5 mol %.

[Preparation of Polymeric Dispersant (B)]

The polymeric dispersant (B) is for example prepared by polymerizing a monomer composition containing the aforementioned monomers in a reaction solvent.

The percentage content of each monomer in the monomer composition (i.e., the percentage of each monomer among all monomers (mol %)) is normally the same as the percentage content of the corresponding monomeric unit (repeating unit) in the target polymeric dispersant (B) (i.e., the percentage of the corresponding monomeric unit among all monomeric units (mol %)).

A reaction solvent, polymerization method, polymerization initiator, and so forth used in preparation of the polymeric dispersant (B) can be selected as appropriate from commonly known examples thereof.

The percentage of each type of monomeric unit among all monomeric units (mol %) in the polymeric dispersant (B) can be measured by $^1$H-NMR analysis.

[Properties of Polymeric Dispersant]

Although no specific limitations are placed on the number-average molecular weight of the polymeric dispersant (B), the number-average molecular weight is preferably at least 1,000,000, more preferably at least 2,000,000, and particularly preferably at least 3,000,000, and is preferably no greater than 25,000,000, more preferably no greater than 15,000,000, and particularly preferably no greater than 10,000,000. Herein, the number-average molecular weight of the polymeric dispersant is calculated by gel permeation chromatography using water as an eluent through comparison to a calibration curve plotted using standard polyethylene glycol.

The following describes specific examples of the polymeric dispersant (B); however, the polymeric dispersant (B) used in the present disclosure is not limited to these examples. (Note that in the following examples, the number in parentheses after the name of each monomer indicates the percentage content (mol %) of a monomeric unit derived from the monomer in each polymeric dispersant (B), and "molar ratio" indicates the molar ratio of monomeric units in each polymeric dispersant (B).)

D-1) Sodium styrenesulfonate (50)/sodium acrylate (50) copolymer (molar ratio=1/1, average degree of polymerization 20,000, number-average molecular weight 3,002,300)

D-2) Sodium styrenesulfonate (50)/sodium methacrylate (50) copolymer (molar ratio=1/1, average degree of polymerization 30,000, number-average molecular weight 4,728,500)

D-3) Sodium styrenesulfonate (66.7)/potassium methacrylate (33.3) copolymer (molar ratio=2/1, average degree of polymerization 50,000, number-average molecular weight 8,710,400)

D-4) Sodium styrenesulfonate (75)/disodium itaconate (25) copolymer (molar ratio=3/1, average degree of polymerization 50,000, number-average molecular weight 9,907,800)

D-5a) Sodium styrenesulfonate (50)/disodium maleate (50) copolymer (molar ratio=1/1, average degree of polymerization 20,000, number-average molecular weight 3,662,300)

D-5b) Sodium styrenesulfonate (50)/disodium maleate (50) copolymer (molar ratio=1/1, average degree of polymerization 50,000, number-average molecular weight 9,155,700)

D-5c) Sodium styrenesulfonate (50)/disodium maleate (50) copolymer (molar ratio=1/1, average degree of polymerization 90,000, number-average molecular weight 16,480,300)

D-6) Sodium styrenesulfonate (75)/disodium maleate (25) copolymer (molar ratio=3/1, average degree of polymerization 20,000, number-average molecular weight 3,893,000)

D-7) Ammonium styrenesulfonate (50)/diammonium maleate (50) copolymer (molar ratio=1/1, average degree of polymerization 30,000, number-average molecular weight 5,266,700)

D-8) Styrene sulfonic acid (50)/maleic acid (50) copolymer (molar ratio=1/1, average degree of polymerization 20,000, number-average molecular weight 3,222,000)

D-9) Sodium styrenesulfonate (50)/disodium fumarate (50) copolymer (molar ratio=1/1, average degree of polymerization 20,000, number-average molecular weight 3,663,300)

D-10) Sodium vinyl sulfonate (50)/sodium acrylate (50) copolymer (molar ratio=1/1, average degree of polymerization 50,000, number-average molecular weight 2,241,400)

D-11) Sodium allyl sulfonate (50)/sodium acrylate (50) copolymer (molar ratio=1/1, average degree of polymerization 20,000, number-average molecular weight 2,381,600)

D-12) Sodium acrylamide-N-butane sulfonate (50)/sodium acrylate (50) copolymer (molar ratio=1/1, average degree of polymerization 80,000, number-average molecular weight 12,051,600)

D-13) Sodium styrenesulfonate (40)/disodium maleate (40)/acrylamide (20) copolymer (molar ratio=2/2/1, average degree of polymerization 30,000, number-average molecular weight 5,577,300)

D-14) Sodium styrenesulfonate (40)/disodium maleate (40)/sodium monomethyl maleate (20) copolymer (molar ratio=2/2/1, average degree of polymerization 15,000, number-average molecular weight 2,977,600)

D-15) Sodium styrenesulfonate (50)/disodium maleate (33.3)/sodium acrylate (16.7) copolymer (molar ratio=3/2/1, average degree of polymerization 25,000, number-average molecular weight 4,977,300)

The concentration of the polymeric dispersant (B) in the presently disclosed CNT dispersion liquid is preferably at least 0.0001 mass %, more preferably at least 0.01 mass %, and particularly preferably at least 0.05 mass %, and is preferably no greater than 30 mass %, more preferably no greater than 10 mass %, and particularly preferably no greater than 5 mass %. Stability of the CNT dispersion liquid and adhesiveness to a substrate of a conductor film formed from the CNT dispersion liquid can be improved as a result of the concentration of the polymeric dispersant (B) being at least 0.0001 mass %. On the other hand, conductivity of a conductor film formed from the CNT dispersion liquid can be ensured as a result of the concentration of the polymeric dispersant (B) being no greater than 30 mass %.

The amount of the polymeric dispersant (B) in the presently disclosed CNT dispersion liquid per 100 parts by mass of the carbon nanotubes (A) is preferably at least 50 parts by mass and more preferably at least 100 parts by mass, and is preferably no greater than 1,000 parts by mass, more preferably no greater than 700 parts by mass, and particularly preferably no greater than 400 parts by mass. Stability of the CNT dispersion liquid and adhesiveness to a substrate of a conductor film formed from the CNT dispersion liquid can be improved as a result of the CNT dispersion liquid containing at least 50 parts by mass of the polymeric dispersant (B) per 100 parts by mass of the carbon nanotubes (A). On the other hand, conductivity of a conductor film formed from the CNT dispersion liquid can be ensured as a result of the CNT dispersion liquid containing no greater than 1,000 parts by mass of the polymeric dispersant (B) per 100 parts by mass of the carbon nanotubes (A).

Other dispersants besides the polymeric dispersant (B) may be used in combination therewith in the presently disclosed CNT dispersion liquid and such combination is not limited to increasing dispersibility. Examples of other dispersants that can be used include various ionic and non-ionic surfactants, synthetic polymers other than the polymeric dispersant (B), and natural polymers.

<Solvent (C)>

Although the solvent (C) may be an aqueous solvent or an organic solvent, an aqueous solvent is preferable (in other words, the solvent (C) preferably includes water). Herein, no specific limitations are placed on the aqueous solvent so long as CNTs can be dispersed therein. The aqueous solvent may be composed only of water or may be a mixed solvent of water and a solvent that is miscible with water. Examples of solvents miscible with water that can be used include ethers (for example, dioxane, tetrahydrofuran, and methyl cellosolve), ether alcohols (for example, ethoxyethanol and methoxyethoxyethanol), esters (for example, methyl acetate and ethyl acetate), ketones (for example, cyclohexanone and methyl ethyl ketone), alcohols (for example, ethanol, isopropanol, and phenol), lower carboxylic acids (for example, acetic acid), amines (for example, triethylamine and trimethanolamine), nitrogen-containing polar solvents (for example, N,N-dimethylformamide, nitromethane, N-methylpyrrolidone, and acetonitrile), and sulfur-containing compounds (for example, dimethyl sulfoxide). Among such examples, ethers, alcohols, and N,N-dimethylformamide are preferable as the solvent that is miscible with water from a viewpoint of improving stability of the CNT dispersion liquid.

Although no specific limitations are placed on the pH of the CNT dispersion liquid in a situation in which the solvent (C) of the CNT dispersion liquid includes water, the pH is preferably at least 0.1, more preferably at least 0.2, and particularly preferably at least 0.5, and is preferably no greater than 8, more preferably less than 7 (i.e., acidic), further preferably no greater than 5, and particularly preferably no greater than 2.5. Stability of the CNT dispersion liquid can be ensured as a result of the pH of the CNT dispersion liquid being in the range described above.

Note that the pH of the CNT dispersion liquid can be lowered by adding an acidic substance. Examples of preferable acidic substances that can be used include sulfuric acid, hydrochloric acid, nitric acid, citric acid, oxalic acid, tartaric acid, formic acid, and phosphoric acid, with hydrochloric acid and nitric acid being more preferable.

<Preparation of Carbon Nanotube Dispersion Liquid>

The presently disclosed CNT dispersion liquid can for example be prepared by mixing the CNTs (A), the polymeric dispersant (B), and the solvent (C) using a mixing and dispersing apparatus described in JP 2013-199419 A. Among such apparatuses, an ultrasonic homogenizer is preferable due to simplicity. The CNTs (A) may be in a dry state or may be in a state including solvent when mixing is performed. Although the CNT dispersion liquid may be in a liquid state or in a semisolid state such as a paste or a gel, the CNT dispersion liquid is preferably in a liquid state.

(Conductor Film and Conductive Film)

A presently disclosed conductor film is formed using the presently disclosed CNT dispersion liquid. The conductor film exhibits excellent adhesiveness to a substrate. The presently disclosed conductor film has excellent handling properties and is therefore suitable for use as a conductive film obtained through formation of the conductor film on a substrate.

<Substrate>

The substrate can be appropriately selected depending on the use that is an objective thereof, without any specific limitations in terms of shape, constituent material, and size (for example, thickness), so long as the carbon nanotube dispersion liquid can be applied thereon and the resultant conductor film can be held thereon.

In terms of shape, the substrate can for example be a film or a sheet.

Examples of inorganic materials that can be used as the constituent material of the substrate include glass and metals such as stainless steel, aluminum, iron, gold, and silver. Examples of organic materials that can be used include carbon materials and plastic substrate materials. A plastic substrate material is preferable from a viewpoint of adhesiveness to the conductor film and improvement of flexibility and extension tracking of the conductive film. Furthermore, the plastic substrate material is preferably a low cost material having high heat resistance and excellent chemical resistance and gas barrier properties. The plastic substrate material may be a colorless and transparent material. Specific examples of plastic substrate materials that can be used include polyesters (for example, polyethylene terephthalate (PET) and polyethylene naphthalate (PEN)), styrenes (for example, syndiotactic polystyrene (SPS)), polyphenylene sulfides (PPS), polycarbonates (PC), polyarylates (PAr), polysulfones (PSF), polyester sulfones (PES), polyetherimides (PEI), transparent polyimides (PI), cycloolefin copolymers (product name: ARTON® (ARTON is a registered trademark in Japan, other countries, or both), and the like), alicyclic polyolefins (product name: ZEONOR® (ZEONOR is a registered trademark in Japan, other countries, or both), and the like), polycarbonates, polyamides, polyurethanes, polymethyl methacrylate, cellulose, and triacetyl cellulose. Among such materials, polyethylene terephthalate (PET), polyethylene naphthalate (PEN), and alicyclic polyolefins are particularly preferable from a viewpoint of chemical stability and cost.

In a situation in which a plastic substrate material is used as the substrate, a preferable thickness of the substrate can, without specific limitation, take various ranges from moderate thickness to extremely thin thickness. The thickness of the substrate in such a situation is preferably from 1 µm to 1,000 µm, more preferably from 5 µm to 500 µm, and particularly preferably from 20 µm to 200 µm.

A conductive film having excellent transparency and conductivity can be obtained by using a transparent substrate as the substrate. In the present disclosure, the term "transparent substrate" is used to refer to a substrate having a light transmittivity of at least 50% at a wavelength of 550 nm.

Note that in the present disclosure, the light transmittivity of the substrate at a wavelength of 550 nm can be measured in accordance with a method described in the Examples of the present description for measuring "light transmittivity of a conductive film at a wavelength of 550 nm".

The substrate may be a substrate that includes an undercoat layer.

A surface of the substrate on which the CNT dispersion liquid is to be applied and the conductor film is to be formed may be subjected to surface hydrophilizing treatment such as glow discharge treatment, corona discharge treatment, or ozone treatment.

Furthermore, a surface at an opposite side of the substrate to the side on which the CNT dispersion liquid is applied may be subjected to hard coating treatment in order to impart abrasion resistance, high surface hardness, solvent resistance, stain resistance, fingerprint resistance, or the like.

<Formation of Conductor Film>

The conductor film is for example formed by applying the presently disclosed CNT dispersion liquid onto the substrate described above (application step) and subsequently drying the CNT dispersion liquid on the substrate (drying step).

[Application Step]

No specific limitations are placed on the method used to apply the presently disclosed CNT dispersion liquid onto the substrate. The method can for example be a commonly known application method such as a method described in JP 2013-199419 A. Application may be performed by a single application or by a plurality of applications as required, and may be performed through a combination of two different application methods. Examples of particularly preferable application methods include wire bar coating, gravure coating, and spray coating.

As explained above, the presently disclosed CNT dispersion liquid can have a higher concentration than conventional CNT dispersion liquids. Therefore, the applied amount of CNTs per unit area of the substrate can be increased to a target level through fewer applications.

No specific limitations are placed on the application thickness (wet thickness) when the CNT dispersion liquid is applied onto the substrate so long as conductivity of the resultant film is ensured. The application thickness is preferably from 0.001 µm to 50 µm, more preferably from 0.005 µm to 10 µm, and particularly preferably from 0.01 µm to 3 µm.

The applied amount of CNTs per unit area of the substrate when the CNT dispersion liquid is applied onto the substrate is preferably from 0.001 mg/m$^2$ to 50 g/m$^2$, more preferably from 0.005 mg/m$^2$ to 10 g/m$^2$, and particularly preferably from 0.01 mg/m$^2$ to 3 g/m$^2$.

[Drying Step]

After the CNT dispersion liquid has been applied onto the substrate, the CNT dispersion liquid is dried on the substrate by a method such as air drying, heating, or reduced pressure drying to form the conductor film on the substrate. No specific limitations are placed on the drying temperature other than being a temperature that enables removal of the solvent (C) by vaporization and that is not higher than a heat resistance temperature of the substrate. For example, in a situation in which a plastic substrate material such as described above is used as the substrate, the drying temperature is preferably from 0° C. to 250° C., more preferably from 15° C. to 150° C., and particularly preferably from 80° C. to 150° C.

<Removal of Dispersant, etc., from Conductor Film>

Since the presently disclosed conductor film may include a dispersant other than the polymeric dispersant (B), a freely selected binder material, and so forth, removal of these materials in particular can lead to improved conductivity of the conductor film. Examples of methods that can be used to remove a dispersant or the like include a method in which after formation of the conductor film on the substrate, the resultant conductive film is immersed in a cleaning solvent, and a method in which a cleaning solvent is sprayed onto the conductor film on the substrate. No specific limitations are placed on the cleaning solvent other than being a solvent that sufficiently dissolves a dispersant or the like that is a target for removal and does not remove the CNTs (A). For example, the cleaning solvent may be water, an alcohol, or acetonitrile.

<Properties of Conductor Film>

The presently disclosed conductor film exhibits excellent adhesiveness to a substrate. The conductor film is formed using the presently disclosed CNT dispersion liquid and it is assumed that the conductor film exhibits excellent adhesiveness because the conductor film has excellent mechanical properties such as film strength and scratch resistance and, as a result, the film remains securely on the substrate without itself being easily ruptured.

Moreover, the presently disclosed conductor film exhibits excellent conductivity as a result of the CNTs (A) being suitably dispersed in the conductor film. The surface resistivity of the presently disclosed conductor film is preferably no greater than 20 Ω/sq and more preferably no greater than 10 Ω/sq, and has a lower limit that is normally approximately 0.01 Ω/sq and preferably 0.1 Ω/sq. In the present disclosure, the surface resistivity of the conductor film can be measured by a method described in the Examples of the present description.

The presently disclosed conductor film can be made transparent through appropriate adjustment of the amount of the CNTs (A) included therein and thus a transparent conductive film can for example be obtained by using a transparent substrate such as previously described as the substrate. The light transmittivity of the conductive film at a wavelength of 550 nm is preferably at least 50%, more preferably at least 60%, further preferably at least 70%, even further preferably at least 80%, and particularly preferably at least 90%. Note that in the present disclosure, the light transmittivity of the conductive film at a wavelength of 550 nm can be measured by a method described in the Examples of the present description.

<Uses of Conductive Film>

No specific limitations are placed on the use of the presently disclosed conductive film. For example, the presently disclosed conductive film can be used as described in JP 2013-199419 A.

The presently disclosed conductive film is particularly suitable for use as a photoelectrode base plate or a counter electrode base plate in a dye-sensitized solar cell (DSC).

EXAMPLES

The following provides a more specific explanation of the present disclosure through examples; however, the present disclosure is not limited to these examples.

Surface resistivity of a conductor film and light transmittivity of a conductive film were measured by the methods described below. Furthermore, stability of a CNT dispersion liquid and adhesiveness of a conductor film to a substrate were evaluated by the methods described below.

<Surface Resistivity>

Surface resistivity was measured as follows by a method in accordance with JIS K7194, using a low resistivity meter (product name: Loresta®-GP MCP-T610 (Loresta is a registered trademark in Japan, other countries, or both), produced by Mitsubishi Chemical Analytech Co., Ltd.).

Specifically, the surface resistivity (sheet resistance) of a conductor film on a substrate forming a conductive film was measured in an environment of 25° C. and 20% RH by a four terminal method.

<Light Transmittivity>

Light transmittivity was measured at a wavelength of 550 nm using a spectrophotometer (V-570 produced by JASCO Corporation).

<Stability of CNT Dispersion Liquid>

After a CNT dispersion liquid had been prepared, the CNT dispersion liquid was left for 1 week at 25° C. and the state thereof was subsequently visually inspected and evaluated based on the following standard.

A: No change in the dispersion liquid was observed and a stable dispersion state was maintained.

B: A black contaminant was observed that covered greater than 0% and less than 5% (area standard) of the bottom surface of the container.

C: A black contaminant was observed that covered at least 5% and less than 50% (area standard) of the bottom surface of the container.

D: A transparent solution portion was present at the top of the container and a black contaminant was observed that covered at least 50% (area standard) of the bottom surface of the container.

<Adhesiveness of Conductor Film to Substrate>

Scotch tape (transparent adhesive tape, width 12 mm) was affixed to a side of a conductive film at which a conductor film was located, and after being left for 2 hours at 25° C., one end of the Scotch tape was lifted up at an angle of 90°. During this lifting, the pealing state of the conductor film from the substrate was visually observed and evaluated based on the following standard.

A: No pealing was observed and adhesiveness was good.

B: Pealing of greater than 0% and less than 10% (area standard) of the conductor film was observed but adhesiveness was of a level that poses almost no problem in practical use.

C: Pealing of at least 10% and less than 40% (area standard) of the conductor film was observed and adhesiveness was of a level that poses a problem in practical use.

D: Pealing of at least 40% (area standard) of the conductor film was observed and adhesiveness was of a very poor level.

<Materials>

[CNTs]

The following CNTs were used.

CNTs 1: Single-walled CNTs (KH Chemicals Co., Ltd., HP, purity 80%), BET specific surface area 620 $m^2/g$ CNTs 2: Single-walled CNTs (Meijo Nano Carbon, SWNT SO), BET specific surface area 800 $m^2/g$ CNTs 3: SGCNTs (prepared by the following procedure), BET specific surface area 1,050 $m^2/g$

[Preparation of CNTs 3 (SGCNTs)]

The CNTs 3 (SGCNTs) were obtained by the super growth method in accordance with the description in WO 2006/011655 A1.

The obtained CNTs 3 had a BET specific surface area of 1,050 $m^2/g$ (closed) and exhibited a radial breathing mode (RBM) spectrum in a low wavenumber domain of from 100 $cm^{-1}$ to 300 $cm^{-1}$, which is characteristic of single-walled CNTs, when measured using a Raman spectrophotometer. Measurement of the diameters of 100 random CNTs 3 using a transmission electron microscope provided results of an average diameter (Av) of 3.3 nm, a diameter distribution (3σ) of 1.9 nm, and a ratio thereof (3σ) of 0.58.

[Dispersant]

In addition to the polymeric dispersants provided as examples further above in the section titled "Polymeric dispersant (B)", the following comparative dispersants A-F were also used as dispersants.

Comparative dispersant A: Sodium polyacrylate (weight-average molecular weight 200,000)

Comparative dispersant B: Ammonium polystyrene (weight-average molecular weight 20,000)

Comparative dispersant C: Carboxymethyl cellulose (weight-average molecular weight 300,000, degree of etherification 0.6 to 0.8)

Comparative dispersant D: Sodium dodecylbenzenesulfonate (molecular weight 348.5)

Comparative dispersant E: Polyoxyethylene-p-octyl phenyl ether (average degree of polymerization 10)

Comparative dispersant F: Sodium styrenesulfonate (90)/disodium maleate (10) copolymer (molar ratio=9/1, average degree of polymerization 20,000, number-average molecular weight 3,931,700)

Example 1

<Preparation of Carbon Nanotube Dispersion Liquid>

A CNT dispersion liquid was prepared by weighing 6.25 mg of the CNTs 1 (CNT content 5.0 mg) and 10 mg of the polymeric dispersant D-5a (200 parts by mass per 100 parts by mass of CNTs) into a 10-mL glass container, adding 8 mL of distilled water and 2 mL of ethanol as a solvent, adjusting the pH to 2 using 1N hydrochloric acid, and subsequently using an ultrasonic homogenizer to perform dispersion treatment under ice cooling with conditions of a power of 50 W and a treatment time of 120 minutes. The dispersion liquid had a CNT concentration of 0.05 mass % and a polymeric dispersant concentration of 0.1 mass %. Stability of the resultant CNT dispersion liquid was evaluated by the previously described method. The results are shown in Table 1.

<Production of Conductor Film and Conductive Film>

A bar coater (#10) was used to apply the resultant CNT dispersion liquid onto a substrate formed by a polyethylene terephthalate (PET) film that had been subjected to hydrophilizing surface treatment (A4100 produced by Toyobo Co., Ltd., 100 µm, A4 size). The applied amount of CNTs per unit area of the substrate was 10 mg/m$^2$. The substrate having the CNT dispersion liquid applied thereon was left in a still, room temperature environment for 10 minutes and was further dried for 5 minutes at 100° C. in a dryer to obtain a conductive film including the substrate and a conductor film thereon. Measurement of surface resistivity and light transmittivity and evaluation of adhesiveness of the conductor film to the substrate were carried out by the previously described methods. The results are shown in Table 1.

Example 2

<Preparation of Carbon Nanotube Dispersion Liquid>

A CNT dispersion liquid was prepared by weighing 20 mg of the CNTs 2 and 40 mg of the polymeric dispersant D-2 (200 parts by mass per 100 parts by mass of CNTs) into a 10-mL glass container, adding 8 mL of distilled water and 2 mL of ethanol as a solvent, adjusting the pH to 1.6 using 1N nitric acid, and subsequently using an ultrasonic homogenizer to perform dispersion treatment under ice cooling with conditions of a power of 50 W and a treatment time of 120 minutes. The dispersion liquid had a CNT concentration of 0.2 mass % and a polymeric dispersant concentration of 0.4 mass %. Stability of the resultant CNT dispersion liquid was evaluated by the previously described method. The results are shown in Table 1.

<Production of Conductive Film>

A bar coater (#10) was used to apply the resultant CNT dispersion liquid onto a substrate formed by a polyethylene terephthalate (PET) film that had been subjected to hydrophilizing surface treatment (A4100 produced by Toyobo Co., Ltd., 100 µm, A4 size). The applied amount of CNTs per unit area of the substrate was 32 mg/m$^2$. The substrate having the CNT dispersion liquid applied thereon was left in a still, room temperature environment for 10 minutes and was further dried for 5 minutes at 100° C. in a dryer to obtain a conductive film including the substrate and a conductor film thereon. Measurement of surface resistivity and light transmittivity and evaluation of adhesiveness of the conductor film to the substrate were carried out by the previously described methods. The results are shown in Table 1.

Examples 3-8

In Examples 3-8, preparation of a CNT dispersion liquid and production of a conductor film and a conductive film were carried out in the same way as in Example 2 with the exception that the polymeric dispersant D-2 was replaced with the polymeric dispersants D-4, D-5a, D-6, D-8, D-12, and D15, respectively. The dispersion liquids in Examples 3-8 each had a CNT concentration of 0.2 mass % and a polymeric dispersant concentration of 0.4 mass %. Each category of measurement and evaluation was carried out in the same way as in Example 1. The results are shown in Table 1.

Example 9

<Preparation of Carbon Nanotube Dispersion Liquid>

A CNT dispersion liquid was prepared by weighing 10 mg of the CNTs 3 and 20 mg of the polymeric dispersant D-5a (200 parts by mass per 100 parts by mass of CNTs) into a 10-mL glass container, adding 8 mL of distilled water and 2 mL of ethanol as a solvent, adjusting the pH to 1.6 using 1N nitric acid, and subsequently using an ultrasonic homogenizer to perform dispersion treatment under ice cooling with conditions of a power of 50 W and a treatment time of 120 minutes. The dispersion liquid had a CNT concentration of 0.1 mass % and a polymeric dispersant concentration of 0.2 mass %. Stability of the resultant CNT dispersion liquid was evaluated by the previously described method. The results are shown in Table 1.

<Production of Conductor Film and Conductive Film>

A bar coater (#10) was used to apply the resultant CNT dispersion liquid onto a substrate formed by a polyethylene terephthalate (PET) film that had been subjected to hydrophilizing surface treatment (A4100 produced by Toyobo Co., Ltd., 100 µm, A4 size). The applied amount of CNTs per unit area of the substrate was 32 mg/m$^2$. The substrate having the CNT dispersion liquid applied thereon was left in a still, room temperature environment for 10 minutes and was further dried for 5 minutes at 100° C. in a dryer to obtain a conductive film including the substrate and a conductor film thereon. Measurement of surface resistivity and light transmittivity and evaluation of adhesiveness of the conductor film to the substrate were carried out by the previously described methods. The results are shown in Table 1.

Example 10

Preparation of a CNT dispersion liquid and production of a conductor film and a conductive film were carried out in the same way as in Example 9 with the exception that the amount of the CNTs 3 was changed to 20 mg and the polymeric dispersant D-5a was replaced with 40 mg of the polymeric dispersant D-5b (200 parts by mass per 100 parts by mass of CNTs). The dispersion liquid had a CNT concentration of 0.2 mass % and a polymeric dispersant concentration of 0.4 mass %. Each category of measurement and evaluation was carried out in the same way as in Example 1. The results are shown in Table 1.

Examples 11 and 12

Preparation of a CNT dispersion liquid and production of a conductor film and a conductive film were carried out in the same way as in Example 10 with the exception that the polymeric dispersant D-5b was replaced by the polymeric dispersants D-6 and D-11 in Examples 11 and 12, respectively. Each category of measurement and evaluation was carried out in the same way as in Example 1. The results are shown in Table 1.

Example 13

Preparation of a CNT dispersion liquid was carried out in the same way as in Example 9 with the exception that the amount of the CNTs 3 was changed to 15 mg and the amount of the polymeric dispersant D-5a was changed to 30 mg (200 parts by mass per 100 parts by mass of CNTs). Furthermore, production of a conductor film and a conductive film was carried out in the same way as in Example 9 with the exception that the CNT dispersion liquid was applied such that the applied amount of CNTs per unit area of the substrate was 394 mg/m$^2$. The dispersion liquid had a CNT concentration of 0.15 mass % and a polymeric dispersant concentration of 0.3 mass %. Each category of measurement and evaluation was carried out in the same way as in Example 1. The results are shown in Table 1.

Comparative Example 1

<Preparation of Carbon Nanotube Dispersion Liquid>

A CNT dispersion liquid was prepared by weighing 25 mg of the CNTs 1 (CNT content 20 mg) and 40 mg of the comparative dispersant A (200 parts by mass per 100 parts by mass of CNTs) into a 10-mL glass container, adding 8 mL of distilled water and 2 mL of ethanol as a solvent, adjusting the pH to 2 using 1N hydrochloric acid, and subsequently using an ultrasonic homogenizer to perform dispersion treatment under ice cooling with conditions of a power of 50 W and a treatment time of 120 minutes.

The dispersion liquid had a CNT concentration of 0.20 mass % and a polymeric dispersant concentration of 0.4 mass %. However, as indicated in Table 1, stability of the dispersion liquid was extremely poor and it was not possible to produce a conductor film and a conductive film of uniform thickness.

Comparative Example 2

Preparation of a CNT dispersion liquid was carried out in the same way as in Comparative Example 1 with the exception that the comparative dispersant A was replaced with the comparative dispersant B. However, as indicated in Table 1, stability of the dispersion liquid was extremely poor and it was not possible to produce a conductor film and a conductive film of uniform thickness.

Comparative Example 3

Preparation of a CNT dispersion liquid was carried out in the same way as in Comparative Example 1 with the exception that the amount of the comparative dispersant B was changed to 80 mg (400 parts by mass per 100 parts by mass of CNTs). The dispersion liquid had a CNT concentration of 0.20 mass % and a polymeric dispersant concentration of 0.8 mass %. Production of a conductor film and a conductive film was carried out in the same way as in Example 1. The applied amount of CNTs per unit area of the substrate was 40 mg/m$^2$. Each category of measurement and evaluation was carried out in the same way as in Example 1. The results are shown in Table 1.

Comparative Example 4

Preparation of a CNT dispersion liquid was carried out in the same way as in Comparative Example 1 with the exception that the comparative dispersant A was replaced with the comparative dispersant C. However, as indicated in Table 1, stability of the dispersion liquid was extremely poor and it was not possible to produce a conductor film and a conductive film of uniform thickness.

Comparative Example 5

Preparation of a CNT dispersion liquid was carried out in the same way as in Comparative Example 3 with the exception that the comparative dispersant B was replaced with the comparative dispersant C. The dispersion liquid had a CNT concentration of 0.20 mass % and a polymeric dispersant concentration of 0.8 mass %. Production of a conductor film and a conductive film was carried out in the same way as in Example 1. The applied amount of CNTs per unit area of the substrate was 40 mg/m$^2$. Each category of measurement and evaluation was carried out in the same way as in Example 1. The results are shown in Table 1.

Comparative Examples 6 and 7

Preparation of a CNT dispersion liquid was carried out in the same way as in Comparative Example 3 with the exception that the comparative dispersant B was replaced with the comparative dispersants D and E in Comparative Examples 6 and 7, respectively. The dispersion liquid had a CNT concentration of 0.20 mass % and a polymeric dispersant concentration of 0.8 mass %. However, as indicated in Table 1, stability of the dispersion liquid was extremely poor and it was not possible to produce a conductor film and a conductive film of uniform thickness.

Comparative Example 8

Preparation of a CNT dispersion liquid was carried out in the same way as in Comparative Example 1 with the exception that the comparative dispersant A was replaced with the comparative dispersant F. The dispersion liquid had a CNT concentration of 0.20 mass % and a polymeric dispersant concentration of 0.4 mass %. Production of a conductor film and a conductive film was carried out in the same way as in Example 1. The applied amount of CNTs per unit area of the substrate was 40 mg/m$^2$. However, as indicated in Table 1, stability of the dispersion liquid was fairly poor and adhesiveness was poor.

TABLE 1

| Category | Carbon nanotubes | | Dispersant | | Amount of dispersant per 100 parts by mass of CNTs (parts by mass) | CNT application amount (mg/m$^2$) | Surface resistivity (Ω/sq) | Light transmittivity (%) | Dispersion stability | Adhesiveness |
|---|---|---|---|---|---|---|---|---|---|---|
| | Type | Concentration (mass %) | Type | Concentration (mass %) | | | | | | |
| Example 1 | CNTs 1 | 0.05 | D-5a | 0.1 | 200 | 10 | 9800 | 78 | A | A |
| Example 2 | CNTs 2 | 0.2 | D-2 | 0.4 | 200 | 32 | 450 | 62 | A | A |

TABLE 1-continued

| Category | Carbon nanotubes Type | Carbon nanotubes Concentration (mass %) | Dispersant Type | Dispersant Concentration (mass %) | Amount of dispersant per 100 parts by mass of CNTs (parts by mass) | CNT application amount (mg/m²) | Surface resistivity (Ω/sq) | Light transmittivity (%) | Dispersion stability | Adhesiveness |
|---|---|---|---|---|---|---|---|---|---|---|
| Example 3 | CNTs 2 | 0.2 | D-4 | 0.4 | 200 | 32 | 530 | 63 | A | A |
| Example 4 | CNTs 2 | 0.2 | D-5a | 0.4 | 200 | 32 | 570 | 63 | B | B |
| Example 5 | CNTs 2 | 0.2 | D-6 | 0.4 | 200 | 32 | 440 | 62 | A | A |
| Example 6 | CNTs 2 | 0.2 | D-8 | 0.4 | 200 | 32 | 480 | 64 | A | B |
| Example 7 | CNTs 2 | 0.2 | D-12 | 0.4 | 200 | 32 | 460 | 63 | B | A |
| Example 8 | CNTs 2 | 0.2 | D-15 | 0.4 | 200 | 32 | 480 | 64 | A | A |
| Example 9 | CNTs 3 | 0.1 | D-5a | 0.2 | 200 | 32 | 370 | 65 | A | A |
| Example 10 | CNTs 3 | 0.2 | D-5b | 0.4 | 200 | 32 | 360 | 66 | A | A |
| Example 11 | CNTs 3 | 0.2 | D-6 | 0.4 | 200 | 32 | 380 | 65 | A | A |
| Example 12 | CNTs 3 | 0.2 | D-11 | 0.4 | 200 | 32 | 360 | 66 | A | A |
| Example 13 | CNTs 3 | 0.15 | D-5a | 0.3 | 200 | 394 | 6 | 0 | A | A |
| Comparative Example 1 | CNTs 1 | 0.2 | Comparative dispersant A | 0.4 | 200 | — | — | — | D | — |
| Comparative Example 2 | CNTs 1 | 0.2 | Comparative dispersant B | 0.4 | 200 | — | — | — | D | — |
| Comparative Example 3 | CNTs 1 | 0.2 | Comparative dispersant B | 0.8 | 400 | 40 | 950 | 55 | B | D |
| Comparative Example 4 | CNTs 1 | 0.2 | Comparative dispersant C | 0.4 | 200 | — | — | — | D | — |
| Comparative Example 5 | CNTs 1 | 0.2 | Comparative dispersant C | 0.8 | 400 | 40 | 1050 | 57 | B | D |
| Comparative Example 6 | CNTs 1 | 0.2 | Comparative dispersant D | 0.8 | 400 | — | — | — | D | — |
| Comparative Example 7 | CNTs 1 | 0.2 | Comparative dispersant E | 0.8 | 400 | — | — | — | D | — |
| Comparative Example 8 | CNTs 1 | 0.2 | Comparative dispersant F | 0.4 | 200 | 40 | — | — | B | D |

Table 1 shows that in each of Examples 1-13 in which a polymeric dispersant (B) was used that included a sulfonic acid group-containing monomeric unit and included a specific percentage content of an ethylenically unsaturated aliphatic carboxylic acid monomeric unit, the CNT dispersion liquid had excellent stability and the conductor film exhibited excellent adhesiveness to the substrate.

On the other hand, in each of Comparative Examples 1, 2, 4, 6, and 7 in which a dispersant was used that did not include either a sulfonic acid group-containing monomeric unit or an ethylenically unsaturated aliphatic carboxylic acid monomeric unit, or that included neither a sulfonic acid group-containing monomeric unit nor an ethylenically unsaturated aliphatic carboxylic acid monomeric unit, dispersibility was extremely poor compared to Examples 1-13.

Furthermore, in Comparative Example 3 in which a dispersant was used that included neither a sulfonic acid group-containing monomeric unit nor an ethylenically unsaturated aliphatic carboxylic acid monomeric unit and Comparative Example 5 in which a dispersant was used that included an ethylenically unsaturated aliphatic carboxylic acid monomeric unit but not a sulfonic acid group-containing monomeric unit, although it was possible to ensure stability of the CNT dispersion liquid by raising the concentration of the dispersant, adhesiveness of the conductor film to the substrate in the resultant conductive film was extremely poor.

In the case of Comparative Example 8 in which a polymeric dispersant was used that included both a sulfonic acid group-containing monomeric unit and an ethylenically unsaturated aliphatic carboxylic acid monomeric unit, but in which the percentage content of the ethylenically unsaturated aliphatic carboxylic acid monomeric unit was not greater than 20 mol %, although it was possible to ensure stability of the CNT dispersion liquid, adhesiveness of the conductor film to the substrate in the resultant conductive film was extremely poor.

INDUSTRIAL APPLICABILITY

According to the present disclosure, a carbon nanotube dispersion liquid can be provided that has excellent stability and that can be used to form a conductor film that exhibits excellent adhesiveness to a substrate.

Furthermore, according to the present disclosure, it is possible to provide a conductor film that exhibits excellent adhesiveness to a substrate and a conductive film including the conductor film.

The invention claimed is:
1. A carbon nanotube dispersion liquid comprising:
carbon nanotubes (A);
a polymeric dispersant (B) including a sulfonic acid group-containing monomeric unit and an ethylenically unsaturated aliphatic carboxylic acid monomeric unit;
a solvent (C); and
at least one of hydrochloric acid and nitric acid, wherein
percentage content of the ethylenically unsaturated aliphatic carboxylic acid monomeric unit in the polymeric dispersant (B) is greater than 20 mol % and no greater than 90 mol %,
the sulfonic acid group-containing monomeric unit in the polymeric dispersant (B) is a monomeric unit derived from a sulfonic acid group-containing monomer in the form of a sulfonate salt,
the ethylenically unsaturated aliphatic carboxylic acid monomeric unit in the polymeric dispersant (B) is a monomeric unit derived from at least one selected from the group consisting of a salt of acrylic acid, a salt of methacrylic acid, a salt of maleic acid, a salt of fumaric acid, and a salt of itaconic acid, a ratio of G band peak intensity relative to D band peak intensity in a Raman spectrum of the carbon nanotubes (A) is at least 1 and no greater than 20, and wherein the solvent (C) includes water, and pH of the carbon nanotube dispersion liquid is at least 0.1 and no greater than 2.5.

2. The carbon nanotube dispersion liquid of claim 1, wherein
the sulfonic acid group-containing monomeric unit in the polymeric dispersant (B) is a monomeric unit derived from a salt of an aromatic sulfonic acid.

3. The carbon nanotube dispersion liquid of claim 1, wherein
percentage content of the sulfonic acid group-containing monomeric unit in the polymeric dispersant (B) is at least 10 mol % and less than 80 mol %.

4. The carbon nanotube dispersion liquid of claim 1, wherein
a ratio of percentage content of the sulfonic acid group-containing monomeric unit in the polymeric dispersant (B) relative to percentage content of the ethylenically unsaturated aliphatic carboxylic acid monomeric unit in the polymeric dispersant (B) is at least 0.5 and less than 4.

5. The carbon nanotube dispersion liquid of claim 1, wherein
the carbon nanotubes (A) include either or both of single-walled carbon nanotubes and double-walled carbon nanotubes.

6. The carbon nanotube dispersion liquid of claim 1, wherein
an amount of the polymeric dispersant (B) per 100 parts by mass of the carbon nanotubes (A) is at least 50 parts by mass and no greater than 1,000 parts by mass.

7. The carbon nanotube dispersion liquid of claim 1, wherein
the carbon nanotubes (A) are single-walled carbon nanotubes.

* * * * *